United States Patent [19]

Bliudnikas

[11] Patent Number: 4,684,961
[45] Date of Patent: Aug. 4, 1987

[54] DETACHABLE FACSIMILE PRINT HEAD DRIVE

[75] Inventor: Kestutis E. Bliudnikas, North Grafton, Mass.

[73] Assignee: Alden Research Foundation, Brockton, Mass.

[21] Appl. No.: 869,567

[22] Filed: Jun. 2, 1986

[51] Int. Cl.⁴ .................... H04N 1/14; B41J 19/00
[52] U.S. Cl. ........................ 346/139 A; 400/320; 400/328
[58] Field of Search .................. 346/139 R, 139 A; 400/320, 328, 352, 357; 74/475, 527

[56] References Cited

U.S. PATENT DOCUMENTS

| 4,262,311 | 4/1981 | Tachikawa et al. | 346/139 A |
| 4,468,143 | 8/1984 | Volke et al. | 400/352 X |
| 4,468,144 | 8/1984 | McMahon et al. | 400/320 X |

Primary Examiner—E. A. Goldberg
Assistant Examiner—Patrick W. Foster
Attorney, Agent, or Firm—James H. Grover

[57] ABSTRACT

In a facsimile recorder a traversing print head is detachably coupled to a cable by a ball on the cable which is seated on the print head by a spring detent with camming ramps which allow automatic disengagement and reengagement of the ball and head and also rotation of the ball in the seat of the head.

10 Claims, 5 Drawing Figures

DETACHABLE FACSIMILE PRINT HEAD DRIVE

BACKGROUND OF THE INVENTION

In facsimile recorders a print head is driven across a sheet of recording paper while electrical signals are applied to the head and marked electrolytically or thermally, for example, during repeated line by line scans traversing the paper. A common method of driving the head on its traverses is by means of a cable passed around a motor driven pair of pulleys, capstans or like drive rolls. To insure synchronization of the applied facsimile signals and movement of the print head along each scan line a very precise coupling of the print head to the cable must be maintained. But if the print head is obstructed accidentally during servicing of the recorder the print head may be seriously dislocated from its correct position on the cable or the print head may be badly damaged.

Accordingly it is the object of the present invention to provide a way of coupling a facsimile print head so that it is not damaged if its traverse is obstructed and so that precise synchronization with applied facsimile signals is maintained, and further to allow for the tendency of the cable to twist.

SUMMARY OF THE INVENTION

According to the invention apparatus for graphic recording of electrical signals comprises a print head traversing the sheet and marking the signals on the sheet; a cable for driving the head on its traverse; and means detachably coupling the cable to the head including a rounded body attached to the cable and a spring detent on the print head having seating surfaces yieldingly pressing the body against the head and engaging the body so as to allow automatic disengagement and reengagement of the body and detent lengthwise of the cable by relative movement of the head and cable and to allow rotation of the body in the detent as the cable twists about its axis.

DRAWINGS

DESCRIPTION

Figure 1:
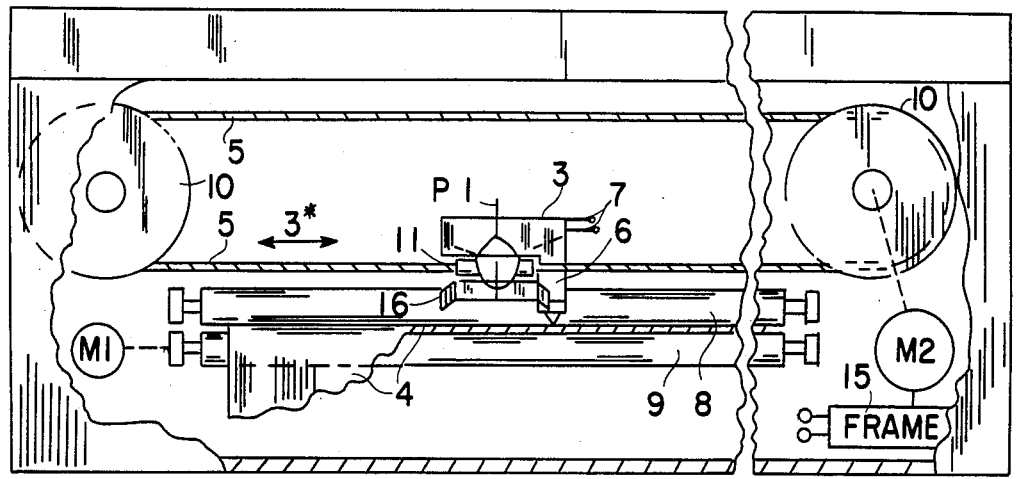
FIG. 1 is a front elevation of a facsimile recorder with a print head coupling according to the invention, partly broken away.

The facsimile recorder shown in FIG. 1 comprises a housing base 1 with a cover 2 within which a print head 3 is driven by a cable 5 on repeated line by line scans in the directions of the double headed arrow 3* across a sheet of recording paper 4. Depending from the print head 3 is a thermal printer 6 which marks the paper 4 with graphic signals corresponding to electrical signals applied to its input terminals 7. The sheet recording paper 4 is fed past the scanning line of the print head by rolls 8, 9 turned by a feed motor M1. The cable 5 is driven reciprocally by a scan motor M2 turning capstans 10. The scan motor is synchronized with the applied electrical signals by a framing circuit 15 responsive to framing components of the applied signal.

It is necessary that the print head start each line traverse of the paper at the same marginal point precisely when the electrical signal starts the signal for that line. Dislocation of head from precise position on the cable 5 by an obstruction will result in distortion of the graphic record or permanent damage to the head.

Such recording distortion or print head damage is avoided in the present invention by a detachable drive coupling between the cable and the print head.

Figures 2, 3:
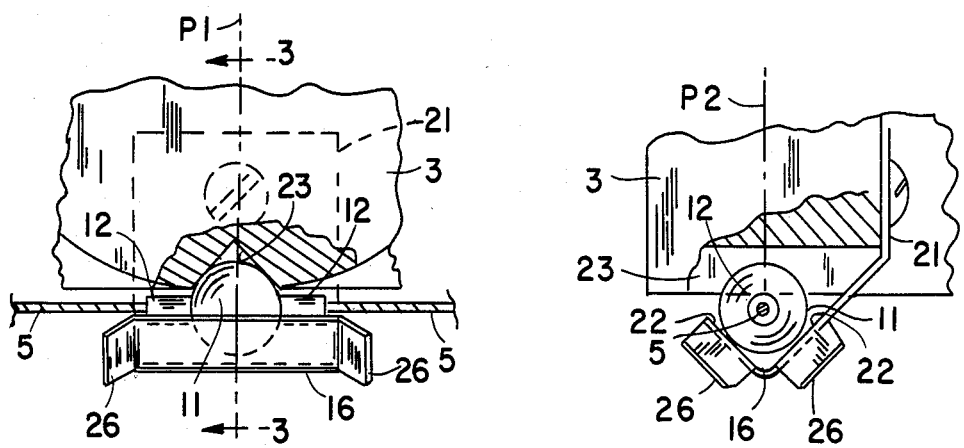
FIG. 2 is an enlarged detail of the print head coupling and its detent.
FIG. 3 is a section on line 3—3 of FIG. 2.
Figure 4:
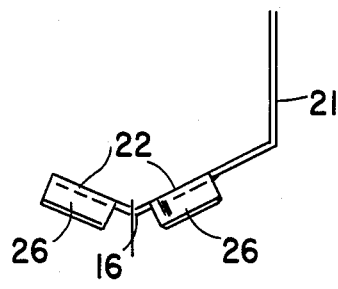
FIGS. 4 and 5 are further enlarged views of the coupling detent.
Figure 5:
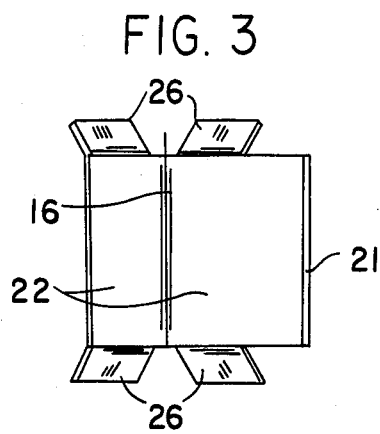

As shown in FIGS. 1 to 3 the coupling includes a rounded body 11 concentric with and greater in diameter than the cable, with tubular extensions 12 at each end crimped on ends of the cable 5. The rounded body is precisely but detachably coupled to the print head 3 by a spring clip or detent 20 which has an arm 21 attached to the print head and which presses the body against the head. For this purpose the detent is formed of springy sheet metal with two flat seating surfaces 22 engaging the body at two points as shown in FIG. 3, these two points and the center of the rounded body lying in a first plane P1 transverse the cable. The rounded body is pressed by the detent into a V-groove under the head formed by two flat surfaces 23 angularly related so as to engage the rounded coupling body at two points which, with the center of the body, lie in a second plane P2 at right angles to the first plane P1. Thus the two point contact of the detent precisely locates the rounded body and the print head transversely with respect to the cable, and the V-groove or a similar seat in the head opposite the detent locates the rounded body lengthwise of the cable.

If the print head should be obstructed accidentally by mislocated recording paper, a tool or a malfunction of the recorder the rounded body is able to disengage from the spring detent lengthwise of the cable owing to the relative lengthwise movement of the cable and head, and avoid damage to the print head although the head will then be dislocated from synchronization with applied signals. The detent is, however, provided with four tabs or ramps 26 inclined outwardly of the cable 5 at both ends of each flat detent surface 22. If the rounded body is accidentally disengaged from the detent, upon subsequent relative movement of the body and print head in either direction, the body will automatically be cammed back and reengaged in precise synchronous relation with the print head. Moreover as the cable twists in its passage around the capstans 10 the rounded body, which is preferably spherical, can rotate axially of the cable in the four point grip of the detent and print head.

It should be understood that the present disclosure is for the purpose of illustration only and that this invention includes all modifications and equivalents which fall within the scope of the appended claims.

I claim:

1. Apparatus for graphic recording of electric signals on a sheet comprising:
 a print head traversing the sheet and marking the signals on the sheet;
 a cable for driving the head on its traverse; and
 means detachably coupling the cable to the head including a rounded body attached to the cable and a spring detent on the print head having seating surfaces yieldingly pressing the body against the head and engaging the body so as to allow automatic disengagement and reengagement of the body and detent lengthwise of the cable by relative movement of the head and cable and to allow rotation of the ball body in the detent as the cable twists about its axis.

2. Apparatus according to claim 1 wherein the head has a seat opposite the detent engaging the rounded coupling body.

3. Apparatus according to claim 1 wherein the detent has two angularly related surfaces engaging the rounded body at two points in a first plane through the center of the body.

4. Apparatus according to claim 3 wherein the head has two angularly related surfaces engaging the rounded body in a second plane through the center of the body at right angles to the first plane.

5. Apparatus according to claim 3 wherein the first plane is normal to the second plane.

6. Apparatus according to claim 3 wherein the detent has ramps inclined outwardly of the cable from its seating surfaces for camming the rounded body into engagement between the head and detent.

7. Apparatus according to claim 1 wherein the detent has ramps inclined outwardly of the cable from its seating surfaces for camming the rounded body into engagement between the head and detent.

8. Apparatus according to claim 3 wherein the plane of the detent surfaces is transverse the cable.

9. Apparatus according to claim 1 wherein the rounded body is greater in diameter than the cable.

10. Apparatus according to claim 1 wherein the rounded body is concentric with the cable.

* * * * *